United States Patent
Yoon et al.

(10) Patent No.: US 11,251,426 B2
(45) Date of Patent: Feb. 15, 2022

(54) METHOD FOR PRODUCING SODIUM COMPOSITE TRANSITION METAL OXIDE, POSITIVE ELECTRODE ACTIVE MATERIAL FOR SODIUM SECONDARY BATTERY, POSITIVE ELECTRODE AND SODIUM SECONDARY BATTERY COMPRISING THE SAME

(71) Applicants: LG Energy Solution, Ltd., Seoul (KR); Seoul National University R&DB Foundation, Seoul (KR)

(72) Inventors: Hyo Jung Yoon, Daejeon (KR); Kyu Tae Lee, Seoul (KR); Mi-Sook Kwon, Incheon (KR); Shin Gwon Lim, Seoul (KR)

(73) Assignees: Seoul National University R&DB Foundation; LG Energy Solution, Ltd.

( * ) Notice: Subject to any disclaimer, the term of this patent is extended or adjusted under 35 U.S.C. 154(b) by 0 days.

(21) Appl. No.: 16/595,822

(22) Filed: Oct. 8, 2019

(65) Prior Publication Data
US 2020/0119348 A1 Apr. 16, 2020

(30) Foreign Application Priority Data
Oct. 12, 2018 (KR) .......................... 10-2018-0121541

(51) Int. Cl.
*H01M 10/05* (2010.01)
*H01M 4/505* (2010.01)
(Continued)

(52) U.S. Cl.
CPC ........ *H01M 4/505* (2013.01); *C01G 49/0072* (2013.01); *H01M 4/525* (2013.01);
(Continued)

(58) Field of Classification Search
CPC ............. C01G 49/0072; C01P 2002/72; C01P 2002/77; C01P 2004/03; C01P 2006/40;
(Continued)

(56) References Cited

U.S. PATENT DOCUMENTS

| 2002/0012843 A1* | 1/2002 | Munakata ............. H01M 4/485 429/231.1 |
| 2007/0218361 A1* | 9/2007 | Inoue ..................... H01M 4/525 429/231.1 |

(Continued)

FOREIGN PATENT DOCUMENTS

| JP | 2016103463 A | 6/2016 |
| JP | 2016110991 A | 6/2016 |

(Continued)

OTHER PUBLICATIONS

Wang, Y., et al., "Influence of Li substitution on the structure and electrochemical performance of P2-type Na0.67Ni0.2Fe0.15Mn0.65O2 cathode materials for sodium ion batteries," Journal of Power Sources 396 (2018) 639-647 (Year: 2018).*

(Continued)

*Primary Examiner* — Mark Kopec
*Assistant Examiner* — Jaison P Thomas
(74) *Attorney, Agent, or Firm* — Lerner, David, Littenberg, Krumholz & Mentlik, LLP

(57) ABSTRACT

A positive electrode active material for a sodium secondary battery includes a sodium composite transition metal oxide represented by Formula 1 and having a P3 crystal structure, and a positive electrode and a sodium secondary battery which include the positive electrode active material.

$$Na_x[Li_aM_{1-a}]O_2 \qquad [\text{Formula 1}]$$

wherein M is at least one transition metal, $0.64 \le x \le 0.7$, and $0.01 \le a \le 0.1$.

8 Claims, 7 Drawing Sheets

(51) Int. Cl.
*H01M 10/054* (2010.01)
*H01M 4/525* (2010.01)
*C01G 49/00* (2006.01)
*H01M 4/02* (2006.01)

(52) U.S. Cl.
CPC ....... *H01M 10/054* (2013.01); *C01P 2002/72* (2013.01); *C01P 2002/77* (2013.01); *C01P 2004/03* (2013.01); *C01P 2006/40* (2013.01); *H01M 2004/028* (2013.01)

(58) Field of Classification Search
CPC ......... H01M 10/054; H01M 2004/028; H01M 4/505; H01M 4/525; Y02E 60/10
See application file for complete search history.

(56) References Cited

U.S. PATENT DOCUMENTS

| | | | |
|---|---|---|---|
| 2014/0014873 A1* | 1/2014 | Yabuuchi | C01D 1/02 252/182.1 |
| 2016/0013470 A1* | 1/2016 | Paulsen | H01M 4/505 429/224 |
| 2016/0064734 A1* | 3/2016 | Li | C01G 53/42 252/182.1 |
| 2016/0218363 A1* | 7/2016 | Meng | H01M 10/054 |
| 2018/0090758 A1* | 3/2018 | Xu | H01G 11/26 |

FOREIGN PATENT DOCUMENTS

| | | | | |
|---|---|---|---|---|
| KR | 20130105676 A | 9/2013 | | |
| KR | 101765406 B | 8/2017 | | |
| WO | WO-2017125279 A1 * | 7/2017 | ............ | H01M 4/485 |

OTHER PUBLICATIONS

Lim et al., "Cathode Materials for Na-Ion Batteries: P3-type Layered Iron-Manganese Oxide," Korean Electrochemical Society, KECS Fall Meeting, Daejeon, Korea, Nov. 2, 2017, 1 page.

Lim et al., "Cathode Materials for Na-Ion Batteries: P3-type Layered Iron-Manganese Oxide," The 2017 Materials Research Society Fall Meeting, Daejeon, Korea, Nov. 28, 2017, 1 page.

* cited by examiner

PRIOR ART

METHOD FOR PRODUCING SODIUM COMPOSITE TRANSITION METAL OXIDE, POSITIVE ELECTRODE ACTIVE MATERIAL FOR SODIUM SECONDARY BATTERY, POSITIVE ELECTRODE AND SODIUM SECONDARY BATTERY COMPRISING THE SAME

TECHNICAL FIELD

Cross-Reference to Related Applications

This application claims the benefit of Korean Patent Application No. 10-2018-0121541, filed on Oct. 12, 2018, in the Korean Intellectual Property Office, the disclosure of which is incorporated herein in its entirety by reference.

TECHNICAL FIELD

The present invention relates to a method of preparing a sodium composite transition metal oxide having a P3 crystal structure, a positive electrode active material for a sodium secondary battery which includes the sodium composite transition metal oxide having a P3 crystal structure, and a positive electrode and a sodium secondary battery which include the positive electrode active material.

BACKGROUND ART

A secondary battery is a battery which may be repeatedly used through a discharge process, in which chemical energy is converted into electrical energy, and a reverse charge process, wherein, with the recent commercialization of portable electronic products and electric vehicles, demand for secondary batteries has been rapidly increased. Lithium secondary batteries have mainly been used as currently commercialized secondary batteries, but, since reserves of lithium, as a main raw material, are limited, the lithium is expensive and is not sufficient to meet the demand for secondary batteries. Thus, there is a need to develop a new secondary battery which may replace the lithium secondary battery, and, recently, research and development on a sodium secondary battery using sodium instead of lithium have been actively attempted.

However, since a sodium ion is relatively larger than a lithium ion, steric hindrance increases when the sodium ion is used as a charge carrier, and, as a result, there is a limitation in that rate capability is reduced when the sodium ion is used in a secondary battery.

In order to address the limitation, Parent Document 1 proposed a technique of using a sodium composite transition metal oxide having a P2 structure as a positive electrode active material for a secondary battery. FIG. 1 illustrates a schematic view of a crystal structure of the sodium composite transition metal oxide having a P2 structure. As illustrated in FIG. 1, in the sodium composite transition metal oxide having a P2 structure, since sodium ions are located at large prismatic sites, the sodium ions move while continuously passing through these sites, and thus, an improvement of the rate capability may be expected. However, with respect to the sodium composite transition metal oxide having a P2 structure, since a distance between a sodium layer and a transition metal layer varies depending on the location of a sodium site, there are two types of sodium sites, $Na_e$ and $Na_f$, with different repulsive forces with respect to transition metal, wherein, since moving speed of the sodium ions is reduced when passing the $Na_f$ with a large repulsive force with respect to the transition metal, an effect of improving the rate capability may be insufficient.

Therefore, there is a need to develop a sodium-based positive electrode active material which may achieve more improved rate capability.

PRIOR ART DOCUMENT

Patent Document

Korean Patent No. 10-1765406

DISCLOSURE OF THE INVENTION

Technical Problem

An aspect of the present invention provides a sodium-based positive electrode active material which includes a sodium composite transition metal oxide having a P3 crystal structure capable of exhibiting rate capability and electrochemical properties and a sodium secondary battery including the same.

Another aspect of the present invention provides a method of preparing the sodium composite transition metal oxide having a P3 crystal structure.

Technical Solution

According to an aspect of the present invention, there is provided a positive electrode active material for a sodium secondary battery which includes a sodium composite transition metal oxide represented by Formula 1 and having a P3 crystal structure.

$$Na_x[Li_aM_{1-a}]O_2 \quad \quad \text{[Formula 1]}$$

In Formula 1, M is transition metal, $0.64 \leq x \leq 0.7$, and $0.01 \leq a \leq 0.1$. Preferably, M may include manganese and iron, and, in this case, the manganese and the iron may be included in an atomic ratio of 1:1. For example, M may be $Mn_{0.5}Fe_{0.5}$.

According to another aspect of the present invention, there is provided a method of preparing a sodium composite transition metal oxide having a P3 crystal structure which includes: mixing a sodium precursor, a lithium precursor, and a transition metal precursor, and performing a heat treatment on the mixture, wherein the sodium precursor is mixed in an amount such that an atomic ratio of sodium in the sodium composite transition metal oxide is in a range of 64 at % to 70 at %, and the lithium precursor is mixed in an amount such that an atomic ratio of lithium in the sodium composite transition metal oxide is in a range of 1 at % to 10 at %.

According to another aspect of the present invention, there is provided a positive electrode for a sodium secondary battery, which includes the positive electrode active material for a sodium secondary battery according to the present invention, and a sodium secondary battery including the same.

Advantageous Effects

With respect to a sodium composite transition metal oxide having a P3 layered crystal structure according to the present invention, since repulsive forces with respect to transition metal are the same at all sodium sites, moving speed is not reduced when sodium ions move, and thus, excellent rate capability may be achieved when used in a sodium secondary battery.

Also, since a positive electrode active material according to the present invention has a smaller change in volume during charge and discharge than a sodium composite transition metal oxide having a P2 structure, excellent life characteristics may be achieved when used in the sodium secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

In this specification, terms, such as 'include', 'including', 'comprise', 'comprising', 'have', 'having', or 'comprised of', should be construed as not excluding the existence or addibility of other features, unless terms such as 'only' are used. Terms in the singular form used for describing elements may include the plural form unless otherwise stated.

In interpreting the elements, the elements should be construed as including a margin of error even if there is no explicit description.

Hereinafter, the present invention will be described in detail.

Positive Electrode Active Material

A positive electrode active material for a sodium secondary battery of the present invention includes a sodium composite transition metal oxide having a P3 crystal structure. In this case, the P3 structure denotes a structure in which alkali cations (sodium ions) are located at prismatic sites and a transition metal layer is stacked three times in a unit cell.

Figure 1:
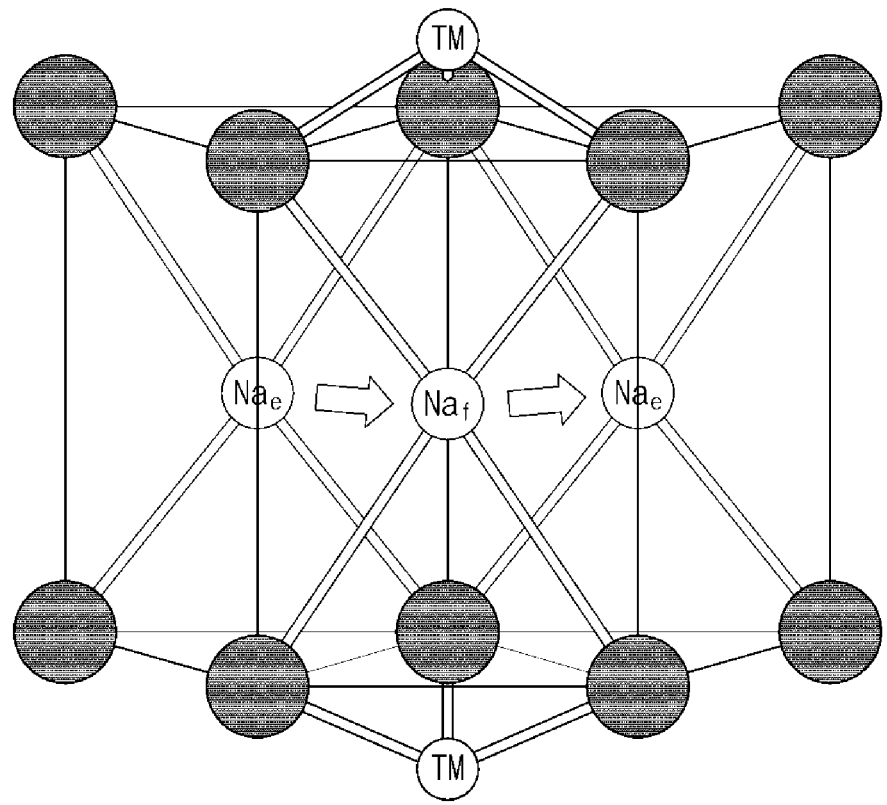
FIG. 1 illustrates movement of sodium ions in a sodium composite transition metal oxide having a P2 crystal structure.
Figure 2:
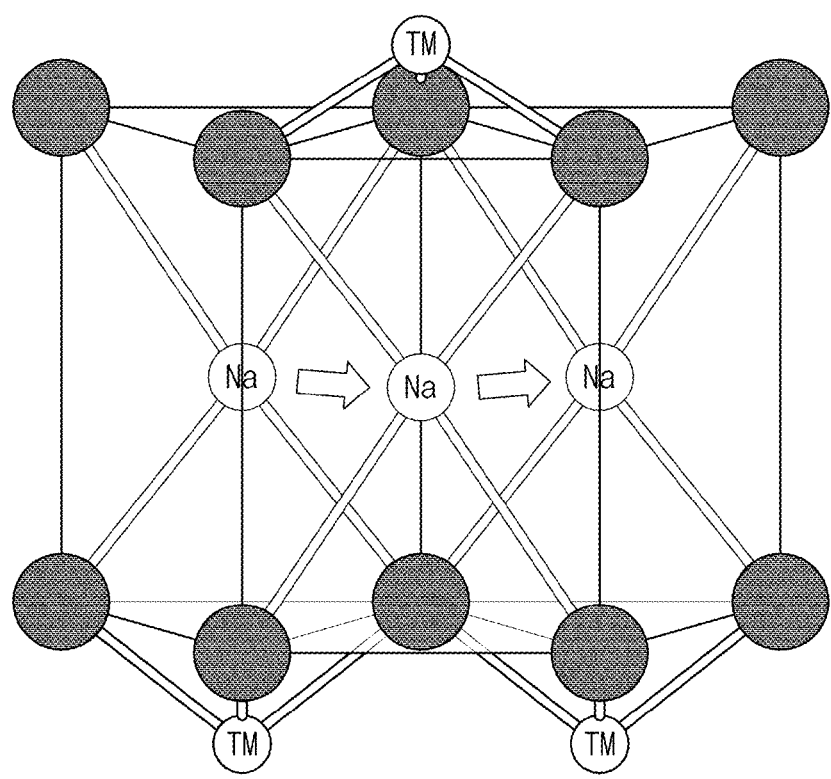
FIG. 2 illustrates movement of sodium ions in a sodium composite transition metal oxide having a P3 crystal structure.

A schematic view of a crystal structure of the sodium composite transition metal oxide having a P3 crystal structure is illustrated in FIG. 2. As illustrated in FIG. 2, with respect to the sodium composite transition metal oxide having a P3 layered crystal structure, since it has a structure in which a transition metal layer is stacked three times in a unit cell, one sides of all sodium sites are edge-shared with the transition metal layer and the other sides thereof are face-shared with the transition metal layer. That is, it is a structure in which repulsive forces with respect to transition metal are the same at all sodium sites. Thus, since moving speed is not reduced when sodium ions move, excellent rate capability may be achieved.

Specifically, the sodium composite transition metal oxide may be represented by Formula 1 below.

  [Formula 1]

In Formula 1, M is transition metal, and, for example, may include manganese (Mn) and iron (Fe). A Fe—Mn-based layered sodium oxide using Fe and Mn as M not only has higher capacity characteristics (>190 mAh/g) than a sodium oxide using other elements, but also has an economic advantage because prices of Fe and Mn, as raw materials, are low.

The manganese and the iron may be included in an atomic ratio of 1:1. Preferably, M may be $Mn_{0.5}Fe_{0.5}$. When the atomic ratio of the manganese to the iron satisfies the above range, the P3 layered crystal structure may be stably formed. x represents an atomic fraction of sodium in the sodium composite transition metal oxide, wherein x may satisfy $0.64 \le x \le 0.7$, preferably $0.65 \le x \le 0.69$, and more preferably $0.66 \le x \le 0.68$. In a case in which the atomic fraction of the sodium satisfies the above range, the P3 layered crystal structure may be smoothly formed.

a represents an atomic fraction of lithium in the sodium composite transition metal oxide, wherein a may satisfy $0.01 \le a \le 0.1$, for example, $0.05 \le a \le 0.1$. In a case in which the atomic fraction of the lithium satisfies the above range, the P3 layered crystal structure may be smoothly formed.

More specifically, the sodium composite transition metal oxide may be represented by [Formula 2] below.

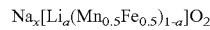  [Formula 2]

In Formula 2, x and a are the same as those described in Formula 1. That is, $0.64 \le x \le 0.7$, and $0.01 \le a \le 0.1$.

Conventionally, with respect to a layered sodium composite transition metal oxide in which an atomic ratio of manganese to iron is 1:1, it is known that, even if a sodium content is adjusted, a P2 structure or O3 structure is only formed, and a P3 structure is not formed. However, according to the research of the present inventors, in a case in which the atomic fraction of the lithium was in a range of 0.01 to 0.1 and the atomic ratio of manganese to iron satisfied 1:1 as in [Formula 2], it was found that a layered sodium composite transition metal oxide having a P3 structure was formed. In a case in which the lithium was not included or the atomic fraction of the lithium was greater than 0.1, the P3 structure was not formed.

The sodium composite transition metal oxide according to the present invention as described above may be prepared by a preparation method including the steps of: mixing a sodium precursor, a lithium precursor, and a transition metal precursor to form a mixture, and performing a heat treatment on the mixture. In this case, a sodium composite transition metal oxide having a P3 layered crystal structure may be prepared by appropriately controlling types and amounts of the sodium precursor, lithium precursor, and transition metal precursor used.

In this case, sodium carbonate, sodium nitrate, sodium acetate, sodium hydroxide, sodium hydroxide hydrate, sodium oxide, or a combination thereof may be used as the sodium precursor, and lithium carbonate, lithium nitrate, lithium acetate, lithium hydroxide, lithium hydroxide hydrate, lithium oxide, or a combination thereof may be used as the lithium precursor. Also, the transition metal precursor may preferably include a manganese precursor and an iron precursor, wherein manganese carbonate, manganese nitrate, manganese acetate, manganese hydroxide, manganese hydroxide hydrate, manganese oxide, or a combination thereof may be used as the manganese precursor, and iron carbonate, iron nitrate, iron acetate, iron hydroxide, iron hydroxide hydrate, iron oxide, or a combination thereof may be used as the iron precursor.

During the mixing of the precursors, each of the precursors is mixed in an amount such that an atomic ratio of each component in the sodium composite transition metal oxide, as the final product, is satisfied. For example, the sodium precursor may be mixed in an amount such that an atomic ratio of sodium in the sodium composite transition metal oxide, as the final product, is in a range of 64 at % to 70 at %, and the lithium precursor may be mixed in an amount such that an atomic ratio of lithium in the sodium composite transition metal oxide is in a range of 1 at % to 10 at %.

Also, the manganese precursor and the iron precursor may be respectively mixed in amounts such that atomic ratios of manganese and iron in the sodium composite transition metal oxide are each in a range of 45 at % to 49.5 at %, and the manganese precursor and the iron precursor may be preferably mixed such that the atomic ratios of the manganese and the iron are the same.

The mixing of the precursors may be performed by using mixing devices commonly used in the art, for example, a ball mill, a V-type mixer, and a stirrer, and may be performed by a dry mixing or wet mixing method. With respect to dry mixing, a highly volatile solvent, such as acetone or ethanol, may be used as a dispersion medium, but the dispersion medium is not limited thereto and any dispersion medium may be used as long as it may be used in the art.

The heat treatment may be performed in a temperature range of 850° C. to 1,200° C. In a case in which the heat treatment temperature is less than 850° C., unreacted metal particles may remain, crystallinity may be low, or a structure other than the P3 structure may be formed, and, in a case in which the heat treatment temperature is greater than 1,200° C., since non-uniformity of elements constituting the sodium composite transition metal oxide may occur, life characteristics may be degraded when used in a sodium secondary battery.

Also, the heat treatment may be performed for 5 hours to 20 hours. In a case in which the heat treatment time is less than 5 hours, since a reaction does not sufficiently occur, unreacted metal particles may remain, crystallinity may be low, or a different structure may be formed, and, in a case in which the heat treatment time is greater than 20 hours, since the non-uniformity of the elements constituting the sodium composite transition metal oxide may occur, the life characteristics may be degraded when used in the sodium secondary battery.

Since the positive electrode active material of the present invention, which includes the sodium composite transition metal oxide prepared by the method as described above, has a P3 structure, moving speed of sodium ions is fast, and thus, excellent rate capability may be achieved.

Furthermore, since the positive electrode active material of the present invention has a small c-axis length change rate during charge and discharge, excellent life characteristics are exhibited. Specifically, the positive electrode active material may have a c-axis length change rate, which is represented by the following Equation (1), of 10% or less, for example, 9% or less.

$$c\text{-axis length change rate } (\%) = \{(C_0 - C)/C_0\} \times 100 \quad \text{Equation (1):}$$

In Equation (1), $C_0$ is a c-axis length of the positive electrode active material in an uncharged state, and C is a c-axis length of the positive electrode active material in a charged state at 4.3 V.

Positive Electrode

Next, a positive electrode according to the present invention will be described. The positive electrode according to the present invention includes the above-described sodium composite transition metal oxide of the present invention as a positive electrode active material.

For example, the positive electrode includes a positive electrode collector and a positive electrode active material layer which is disposed on at least one surface of the positive electrode collector and includes the above-described positive electrode active material.

In this case, the positive electrode active material may be included in an amount of 80 wt % to 99 wt %, for example, 85 wt % to 98 wt % based on a total weight of the positive electrode active material layer. When the positive electrode active material is included within the above amount range, excellent capacity characteristics may be exhibited.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and a binder in addition to the above-described positive electrode active material.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be included in an amount of 1 wt % to 30 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the above-described positive electrode active material as well as selectively the binder and the conductive agent in a solvent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Sodium Secondary Battery

Next, a sodium secondary battery according to the present invention will be described.

The sodium secondary battery according to the present invention includes the above-described positive electrode according to the present invention, that is, the positive electrode including the sodium composite transition metal oxide, which is represented by Formula 1 and has the P3 crystal structure, as the positive electrode active material. Specifically, the sodium secondary battery according to the present invention includes the positive electrode according to the present invention, a negative electrode disposed to face the positive electrode, a separator disposed between the positive electrode and the negative electrode, and an electrolyte. Since the positive electrode has been described above, only the other components will be described hereinafter.

In the sodium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating sodium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic sodium thin film may be used as the negative electrode active material.

The binder and the conductive agent may be the same as those previously described in the positive electrode.

The negative electrode active material layer, for example, may be prepared by coating a composition for forming a negative electrode active material layer, which is prepared by dissolving or dispersing the negative electrode active material as well as selectively the binder and the conductive agent in a solvent, on the negative electrode collector and drying the coated negative electrode collector, or may be prepared by casting the composition for forming a negative electrode active material layer on a separate support and then laminating a film separated from the support on the negative electrode collector.

In the sodium secondary battery, the separator separates the negative electrode and the positive electrode and provides a movement path of lithium ions, wherein separators commonly used in secondary batteries may be used, and a type thereof is not particularly limited. For example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof, or a porous nonwoven fabric formed of high melting point glass fibers or polyethylene terephthalate fibers may be used as the separator. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the sodium secondary battery, but the present invention is not limited thereto.

Specifically, the electrolyte may include an organic solvent and a sodium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic hydrocarbon group having 2 to 20 carbon atoms and may include a double-bond aromatic ring or ether bond); amides such as dimethylformamide; dioxolanes such as 1,3-dioxolane; or sulfolanes may be used as the organic solvent.

The sodium salt may be used without particular limitation as long as it is a compound capable of providing sodium ions used in the sodium secondary battery. Specifically, $NaPF_6$, $NaClO_4$, $NaAsF_6$, $NaBF_4$, $NaCF_3SO_3$, $NaB(C_6H_5)_4$, $NaC_4F_9SO_3$, $NaN(C_2F_5SO_3)_2$, $NaN(C_2F_5SO_2)_2$, or $NaN(CF_3SO_2)_2$ may be used as the sodium salt. The sodium salt may be used in a concentration range of 0.1 M to 2.0 M.

In order to improve lifetime characteristics of the battery, suppress the reduction in battery capacity, and improve discharge capacity of the battery, at least one additive, for example, a halo-alkylene carbonate-based compound such as fluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, the sodium secondary battery including the positive electrode active material according to the present invention may be used in portable devices, such as mobile phones, notebook computers, and digital cameras, and electric cars such as hybrid electric vehicles (HEVs).

EXAMPLES

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein. Next, the present invention will be described in more detail, according to specific examples.

Example 1

$Na_2CO_3$, $Mn_2O_3$, $Fe_3O_4$, and $Li_2CO_3$ were mixed in amounts such that an atomic ratio of Na:Mn:Fe:Li was 0.67:0.45:0.45:0.1, and the mixture was then uniformly mixed by being wet ball-milled with acetone at 500 rpm for 1 hour. Next, after the mixture was put in an alumina crucible, a heat treatment was performed by using a muffle furnace at 900° C. for 10 hours in an air atmosphere to synthesize a sodium composite transition metal oxide with a composition of $Na_{0.67}[Li_{0.1}(Fe_{0.5}Mn_{0.5})_{0.1}]O_2$.

Comparative Example 1

$Na_2CO_3$, $Mn_2O_3$, and $Fe_3O_4$ were mixed in amounts such that an atomic ratio of Na:Mn:Fe was 0.67:0.5:0.5, and the mixture was then uniformly mixed by being wet ball-milled with acetone at 500 rpm for 1 hour. Next, after the mixture was put in an alumina crucible, a heat treatment was performed by using a muffle furnace at 900° C. for 10 hours in an air atmosphere to synthesize a sodium composite transition metal oxide with a composition of $Na_{0.67}[Fe_{0.5}Mn_{0.5}]O_2$.

Experimental Example 1: XRD Analysis

X-ray diffraction (XRD) analysis was performed on the sodium composite transition metal oxides prepared by Example 1 and Comparative Example 1 using Cu K-α radiation (λ=1.5418 Å). The analysis results are presented in FIG. 3.

Figure 3:
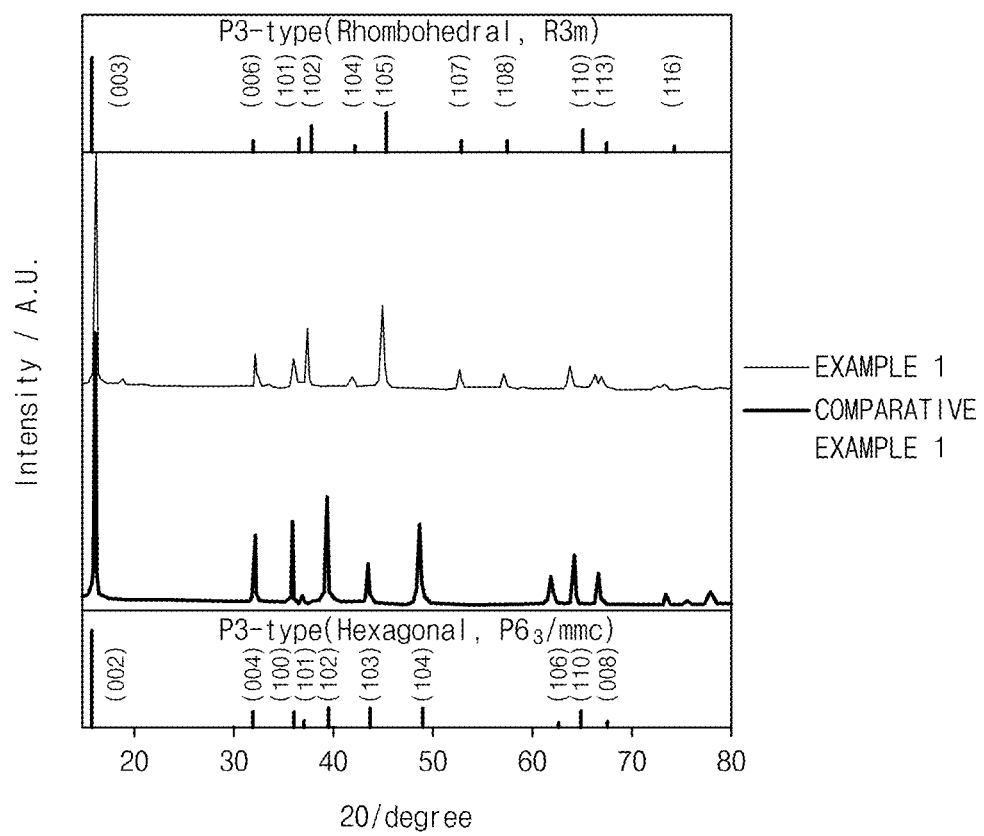
FIG. 3 illustrates X-ray diffraction (XRD) patterns of sodium composite transition metal oxides prepared by Example 1 and Comparative Example 1.

According to XRD patterns illustrated in FIG. 3, it may be confirmed that the sodium composite transition metal oxide of Example 1 had peaks corresponding to a P3 structure and the sodium composite transition metal oxide of Comparative Example 1 had peaks corresponding to a P2 structure.

Experimental Example 2: SEM Analysis

Particle shapes of the sodium composite transition metal oxides prepared by Example 1 and Comparative Example 1 were measured by a scanning electron microscope. In this case, JSM-6701F by JEOL Ltd. was used as a measurement instrument, and the measurement results are illustrated in FIGS. 4 and 5.

Figure 4:
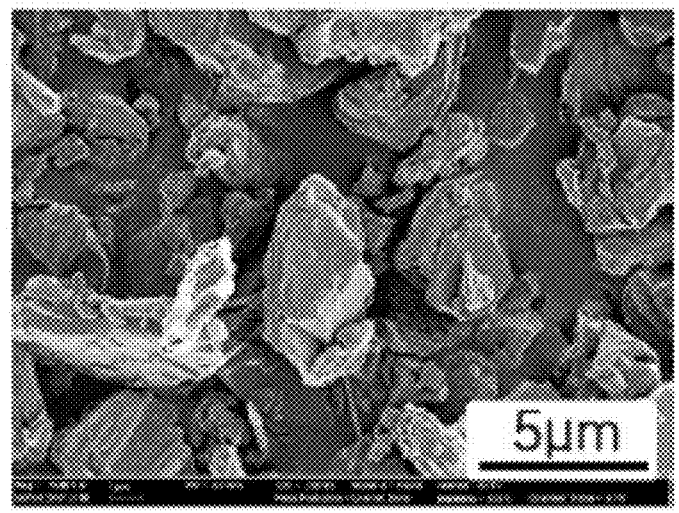
FIG. 4 illustrates a scanning electron microscope image of the sodium composite transition metal oxide prepared by Example 1.
Figure 5:
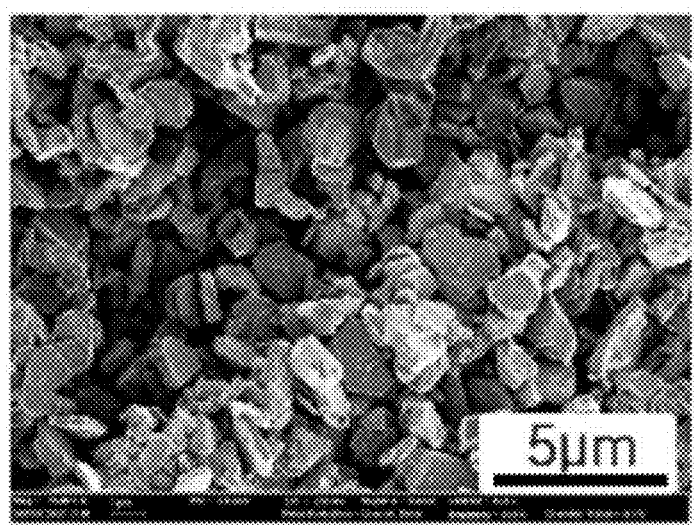
FIG. 5 illustrates a scanning electron microscope image of the sodium composite transition metal oxide prepared by Comparative Example 1.

FIG. 4 illustrates a scanning electron microscope image of the sodium composite transition metal oxide synthesized by Example 1, and FIG. 5 illustrates a scanning electron microscope image of the sodium composite transition metal oxide synthesized by Comparative Example 1.

As illustrated in FIGS. 4 and 5, sodium composite transition metal oxide particles prepared by Example 1 had a plate shape and had a size of about 5 μm, and sodium composite transition metal oxide particles prepared by Comparative Example 1 had a plate shape and had a size of about 2 μm.

Example 2

After the sodium composite transition metal oxide prepared by Example 1 as a positive electrode active material, carbon black (Super P) as a conductive agent, and polyvinylidene fluoride (PVdF), as a binder, were weighed to obtain a weight ratio of 80:10:10, the positive electrode active material and the conductive agent were first mixed by using a mortar, the mixed powder was mixed with the binder and N-methylpyrrolidone (NMP), and the mixture was uniformly mixed by using a stirrer (Thinky mixer) to prepare a positive electrode slurry.

After the positive electrode slurry was coated on an aluminum current collector using an applicator to a thickness of 200 μm and dried to remove the NMP, the coated aluminum current collector was rolled to prepare an electrode.

The electrode thus prepared was punched to a size of 1.4 cm and moisture was then removed by vacuum drying the punched electrode at 120° C. for 8 hours to prepare a positive electrode.

A coin half-cell was prepared by using the positive electrode prepared as described above, sodium metal as a counter electrode, a glass fiber separator as a separator, and a solution, in which 2 wt % fluoroethylene carbonate (FEC) and 1.0 M $NaClO_4$ were added to a solvent in which ethylene carbonate and propylene carbonate were mixed in a volume ratio of 1:1, as an electrolyte.

Comparative Example 2

A coin half-cell was prepared in the same manner as in Example 1 except that the sodium composite transition metal oxide prepared by Comparative Example 1 was used as a positive electrode active material.

Experimental Example 3

After the half-cells of Example 2 and Comparative Example 2 were disassembled in a glove box in an argon atmosphere to recover the positive electrodes, the positive electrode active materials were sampled using a Be window and a kapton tape, and a c-axis length of each positive electrode active material in an uncharged state was measure by performing Ex-Situ XRD analysis in a state in which contact with moisture and air was blocked.

Also, after the half-cells of Example 2 and Comparative Example 2 were charged at a current density of 12 mA/g to 4.3 V relative to sodium metal, the charged cells were disassembled in a glove box in an argon atmosphere to recover the positive electrodes, the electrolyte salt was removed by washing the positive electrodes several times in a dimethyl carbonate solvent, the positive electrode active materials were then sampled using a Be window and a kapton tape, and a c-axis length of each positive electrode active material after charge was measure by performing Ex-Situ XRD analysis in a state in which contact with moisture and air was blocked.

The measured c-axis length when uncharged and the measured c-axis length after charge were substituted into the following Equation (1) to measure a c-axis length change rate.

$$c\text{-axis length change rate (\%)} = \{(C_0 - C)/C_0\} \times 100 \quad \text{Equation (1):}$$

In Equation (1), $C_0$ is the c-axis length of the positive electrode active material in an uncharged state, and C is the c-axis length of the positive electrode active material in a charged state at 4.3 V.

The measurement results are presented in Table 1 below.

TABLE 1

| Category | c-axis length when uncharged (unit: Å) | c-axis length after charge (unit: Å) | c-axis length change rate (unit: %) |
|---|---|---|---|
| Example 2 | 16.7254 | 15.3877 | 8 |
| Comparative Example 2 | 11.3104 | 9.8701 | 13 |

As illustrated in Table 1, in a case (Example 2) in which the sodium composite transition metal oxide having a P3 structure prepared in Example 1 was used as a positive electrode active material, it may be confirmed that a volume change rate when charged was smaller than that of a case (Comparative Example 2) where the sodium composite transition metal oxide having a P2 structure prepared in Comparative Example 1 was used as a positive electrode active material.

Experimental Example 4

The coin half-cells prepared by Example 2 and Comparative Example 2 were charged and discharged at a current density of 12 mA/g in a voltage range of 1.5 V to 4.3 V relative to sodium metal to evaluate charge and discharge characteristics. Charge and discharge profiles of the coin half-cell of Example 2 in a first cycle and a second cycle are illustrated in FIG. 6, and charge and discharge profiles of the coin half-cell of Comparative Example 2 in a first cycle and a second cycle are illustrated in FIG. 7.

Figure 6:
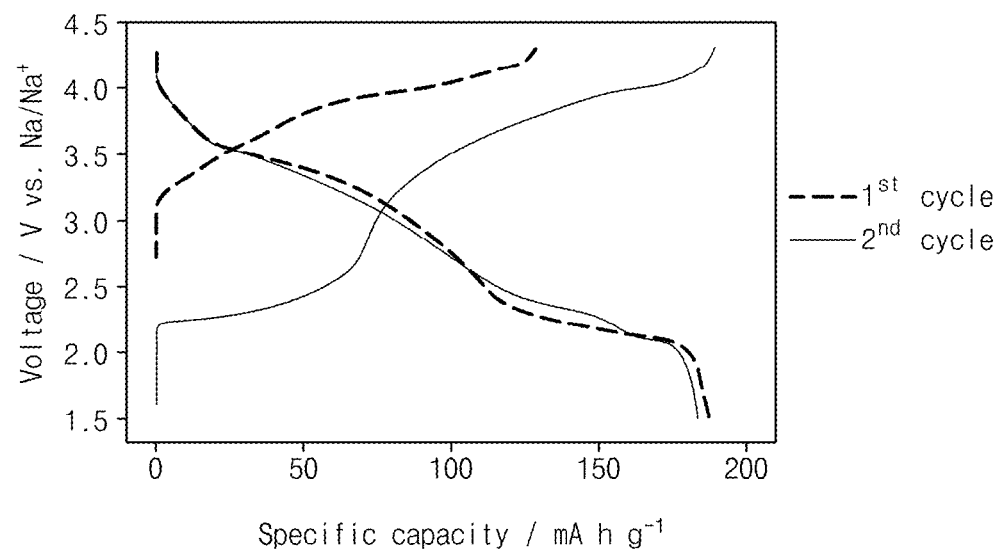
FIG. 6 is a graph illustrating charge and discharge characteristics of a coin half-cell prepared by Example 2.
Figure 7:
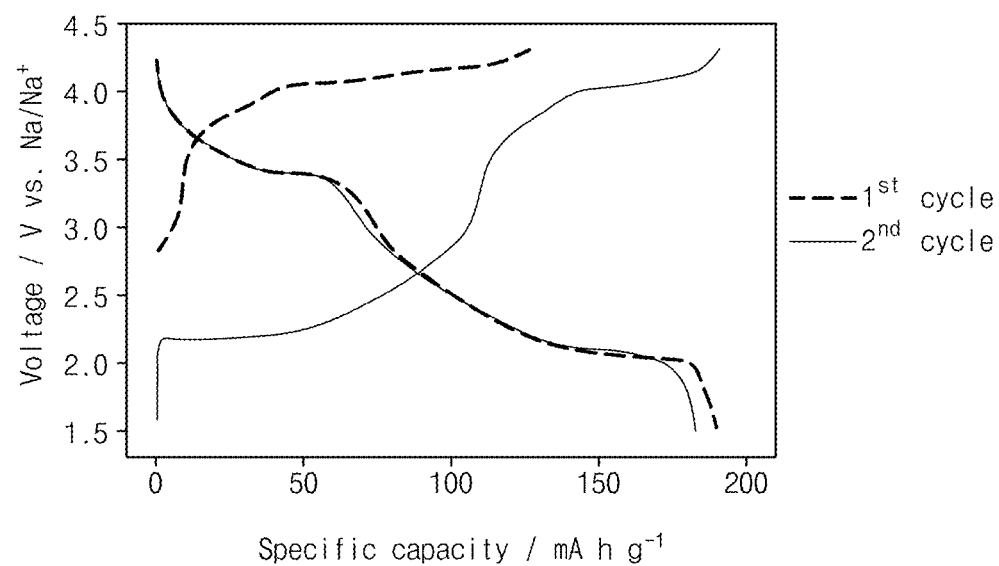
FIG. 7 is a graph illustrating charge and discharge characteristics of a coin half-cell prepared by Comparative Example 2.

As illustrated in FIGS. 6 and 7, discharge capacity of the coin half-cell of Example 2 in the first cycle was somewhat lower than that of the coin half-cell of Comparative Example 2, but it may be confirmed that the coin half-cell of Example 2 exhibited an equivalent level of discharge capacity in the second cycle.

Experimental Example 5

Quasi-open circuit voltages (QOCVs) were measured using a galvanostatic intermittent titration technique (GITT) in which a testing of the coin half-cells prepared by Example 2 and Comparative Example 2 at a constant current of 0.1C rate in a voltage range of 1.5 V to 4.3 V relative to sodium metal for 10 minutes and a stopping of the constant current testing for 50 minutes were repeated. The measurement results are illustrated in FIG. 8.

Figure 8:
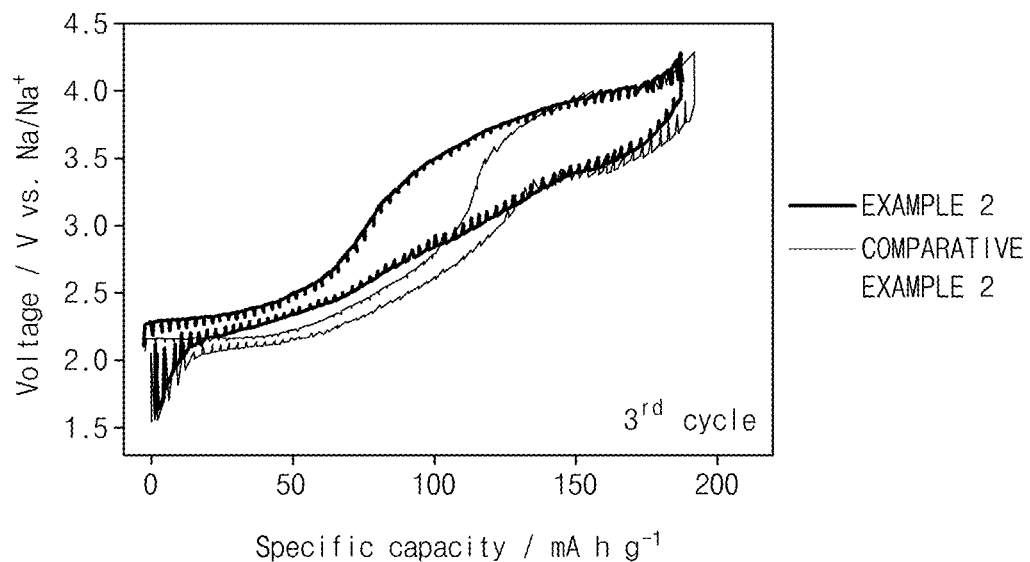
FIG. 8 is a graph illustrating results of quasi-open circuit voltage measurements of the coin half-cells prepared by Example 2 and Comparative Example 2.

As illustrated in FIG. 8, it may be confirmed that the quasi-open circuit voltage of Example 2 using the sodium composite transition metal oxide having a P3 structure as an active material was higher than that of Comparative Example 2 using the sodium composite transition metal oxide having a P2 structure as an active material. Also, it may be confirmed that an area formed by a closed curve in a graph of Example 2 was greater than an area formed by a closed curve in a graph of Comparative Example 2, and this indicates that energy density of Example 2 was greater than energy density of Comparative Example 2.

Experimental Example 6

The coin half-cells prepared by Example 2 and Comparative Example 2 were charged and discharged at a constant current of 0.1C rate in a voltage range of 1.5 V to 4.3 V relative to sodium metal to measure life characteristics during 100 cycles. The measurement results are illustrated in FIG. 9.

Figure 9:
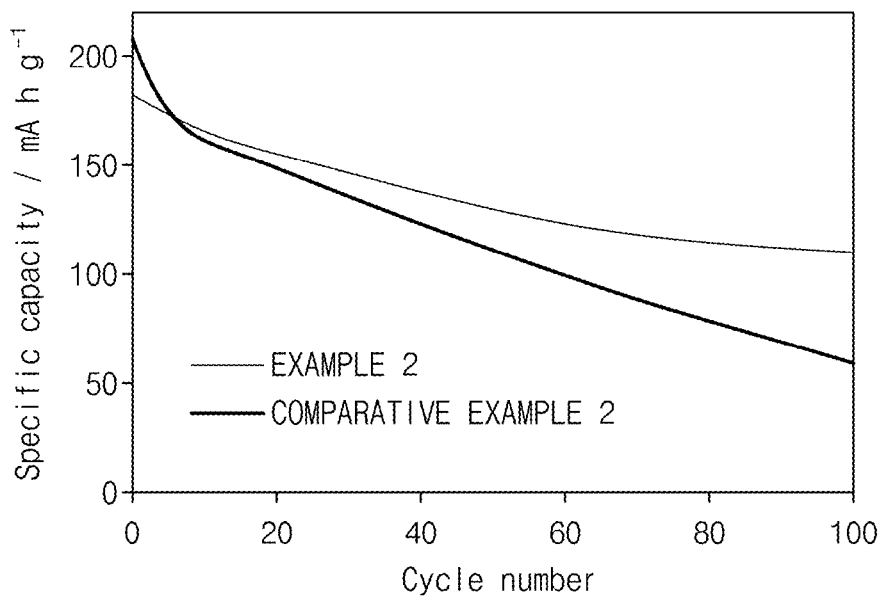
FIG. 9 is a graph illustrating life characteristics of the coin half-cells prepared by Example 2 and Comparative Example 2.

As illustrated in FIG. 9, it may be confirmed that the life characteristics of the coin half-cell of Example 2 were better than those of the coin half-cell of Comparative Example 2. This is considered due to the fact that the positive electrode active material of the P3 structure used in Example 2 had a smaller change in volume during charge and discharge than the positive electrode active material of the P2 structure used in Comparative Example 2.

Experimental Example 7

Rate capabilities were measured while 3 cycles of charge and discharge of the coin half-cells prepared by Example 2 and Comparative Example 2 were respectively performed at 0.1C, 0.2C, 0.5C, 0.7C, 1C, 2C, 5C, 10C, and 20C rates in a voltage range of 1.5 V to 4.3 V relative to sodium metal. The measurement results are illustrated in FIG. 10.

Figure 10:
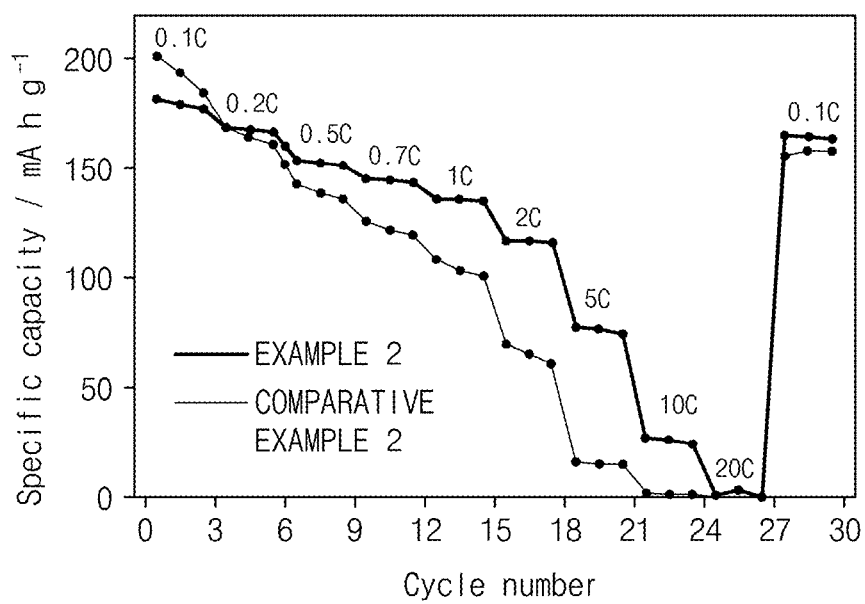
FIG. 10 is a graph illustrating rate capabilities of the coin half-cells prepared by Example 2 and Comparative Example 2.

As illustrated in FIG. 10, since Example 2 using the positive electrode active material of the P3 structure had a smaller change in specific capacity at the same c-rate than Comparative Example 2 using the positive electrode active material of the P2 structure and its specific capacity recovery rate was also high, it may be understood that its rate capability was better.

The invention claimed is:

1. A positive electrode active material for a sodium secondary battery, the positive electrode active material comprising a sodium composite transition metal oxide which is represented by Formula 1 and has a P3 crystal structure:

$$Na_x[Li_aM_{1-a}]O_2 \quad \text{[Formula 1]}$$

wherein, M is a transition metal, $0.64 \leq x \leq 0.7$, and $0.01 \leq a \leq 0.1$.

2. The positive electrode active material for a sodium secondary battery of claim 1, wherein the M comprises manganese and iron.

3. The positive electrode active material for a sodium secondary battery of claim 2, wherein the manganese and the iron are included in an atomic ratio of 1:1.

4. The positive electrode active material for a sodium secondary battery of claim 1, wherein the M is $Mn_{0.5}Fe_{0.5}$.

5. The positive electrode active material for a sodium secondary battery of claim 1, wherein the sodium composite transition metal oxide is represented by Formula 2:

$$Na_x[Li_a(Mn_{0.5}Fe_{0.5})_{1-a}]O_2 \quad \text{[Formula 2]}$$

wherein, $0.64 \leq x \leq 0.7$, and $0.01 \leq a \leq 0.1$.

6. The positive electrode active material for a sodium secondary battery of claim 1, wherein the positive electrode active material has a c-axis length change rate, which is represented by Equation (1), of 10% or less:

$$c\text{-axis length change rate (\%)} = \{(C_0 - C)/C_0\} \times 100 \quad \text{Equation (1):}$$

wherein, $C_0$ is a c-axis length of the positive electrode active material in an uncharged state, and C is a c-axis length of the positive electrode active material in a charged state at 4.3 V.

7. A positive electrode for a sodium secondary battery, the positive electrode comprising the positive electrode active material for a sodium secondary battery of claim 1.

8. A sodium secondary battery comprising the positive electrode for a sodium secondary battery of claim 7.

* * * * *